United States Patent [19]

Hymel

[11] Patent Number: 5,426,426
[45] Date of Patent: Jun. 20, 1995

[54] TOKENS FOR USE IN DATA COMMUNICATIONS SYSTEMS

[75] Inventor: James A. Hymel, Lake Worth, Fla.

[73] Assignee: Motorola, Inc., Schaumburg, Ill.

[21] Appl. No.: 107,437

[22] Filed: Aug. 16, 1993

[51] Int. Cl.⁶ ............................................. H04Q 1/00
[52] U.S. Cl. .......................... 340/825.55; 340/825.44; 364/151; 371/37.8; 379/57
[58] Field of Search ...................... 340/825.54, 825.55, 340/825.44, 311.1; 364/148, 151; 379/57, 58, 59, 60, 88; 371/37.8; 455/38.1, 38.2; 381/30, 36, 43

[56] References Cited

U.S. PATENT DOCUMENTS

| | | | |
|---|---|---|---|
| 4,263,480 | 4/1981 | Levin | 379/57 |
| 4,330,780 | 5/1982 | Masaki | 340/825.44 |
| 4,336,524 | 6/1982 | Levin | 340/825.44 |
| 4,479,124 | 10/1984 | Rodriguez et al. | 340/825.44 |
| 4,928,096 | 5/1990 | Leonardo et al. | 340/825.44 |
| 4,994,797 | 2/1991 | Breeden | 340/825.44 |
| 5,066,949 | 11/1991 | Breeden et al. | 340/825.44 |
| 5,109,220 | 4/1992 | Breeden et al. | 379/57 |

Primary Examiner—Donald J. Yusko
Assistant Examiner—Gregg V. Miller
Attorney, Agent, or Firm—James A. Lamb

[57] ABSTRACT

A system for generating and substituting tokens for frequently used phrases within the information portion of messages comprises a central control terminal (140) and a selective call receiver (160). The central control terminal (140) includes a dynamic token generator for generating a set of most frequently used phrases having uniquely associated tokens therewith, the token generator accumulating and analyzing a number of the information portion of messages received at the central control terminal (140) intended for transmission to one or more selective call receivers to derive the set of most frequently used phrases, a most frequently used phrase storage memory for storing within the central control terminal the generated set of most frequently used phrases and associated tokens, and a most frequently used phrase downloading device for transmitting via a radio frequency transmitted message the generated set of most frequently used phrases and associated tokens to the one or more selective call receivers.

21 Claims, 12 Drawing Sheets

| | 520 | 530 | 534 | 536 |
|---|---|---|---|---|
| 510 | TOKEN #1 | MFU #1 | OC #1 | Validity #1 |
| | TOKEN #2 | MFU #2 | OC #2 | Validity #2 |
| | TOKEN #3 | MFU #3 | OC #3 | Validity #3 |
| | TOKEN #4 | MFU #4 | OC #4 | Validity #4 |
| | TOKEN #5 | MFU #5 | OC #5 | Validity #5 |
| 500 | TOKEN #6 | MFU #6 | OC #6 | Validity #6 |
| 550 | ⋮ | ⋮ | ⋮ | ⋮ |
| | TOKEN #32 | MFU #32 | OC #32 | Validity #32 |
| | TOKEN #1 | MFU #1 | OC #1 | Validity #1 |
| 560 | TOKEN #2 | MFU #2 | OC #2 | Validity #2 |
| | TOKEN #3 | MFU #3 | OC #3 | Validity #3 |
| | TOKEN #4 | MFU #4 | OC #4 | Validity #4 |
| | TOKEN #5 | MFU #5 | OC #5 | Validity #5 |
| | TOKEN #6 | MFU #6 | OC #6 | Validity #6 |

570
MESSAGE L
MESSAGE L-1
MESSAGE L-2
MESSAGE L-3
MESSAGE L-4
MESSAGE L-5
⋮
575
MESSAGE L-19

| | | | |
|---|---|---|---|
| #1 | Please call James at | 1 | false |
| #2 | Please call | 3 | false |
| #3 | Fred at the office | 1 | false |
| #4 | at 734-2020 | 1 | false |

*FIG. 5*

| |
|---|
| Call me #4 |
| Emergency, #2 #3 |
| #2 Fred at the office |
| #2 Janice at work now |
| #1 734-2020 |

*FIG. 6*

|  593 | 590 |
|---|---|
| TOKEN #1 | MFU #1 |
| TOKEN #2 | MFU #2 |
| TOKEN #4 | MFU #4 |
| TOKEN #6 | MFU #6 |
| TOKEN #7 | MFU #7 |
| TOKEN #9 | MFU #9 |
| ⋮ | ⋮ |
| TOKEN #32 | MFU #32 |

Ⓓ → STORE DATA MESSAGE CONTAINING TOKENS INTO THE FIRST IN FIRST OUT MESSAGE STORAGE TABLE → Ⓐ

*FIG. 12*

TOKENS FOR USE IN DATA COMMUNICATIONS SYSTEMS

FIELD OF THE INVENTION

This invention relates in general to a selective call communication system, and in particular to a method and apparatus in a radio communication system to increase the throughput of transmitted information by using data message tokens.

BACKGROUND OF THE INVENTION

Various methods have been used for increasing the effective capacity and functionality of selective call radio communication systems, such as paging systems. Such methods transmit to the selective called devices, such as pagers, a short segment of information (herein called a token) which is substituted for a longer segment of information such as a caller source ID (phone number), a call back number, any one predetermined alphanumeric phrase, or any one digitized voice audio signal. One such method appends a token, which identifies the caller phone number, to an alphanumeric message of variable length and transmits the appended message to the pager. When the message is received by the pager, either the message is presented to the user with the tokens as received, or the long phrase is substituted back into the messages before the messages are further processed for presentation or other use. In the latter case, the tokens and associated long phrases must be stored into a memory within the pager, and a means of associating the long phrases with the tokens is required. In either case, the use of tokens reduces the transmission duration, thus increasing the effective capacity of the system. The tokens are typically digital in nature whereas the long phrases can be reconstructed voice.

A method of determining the long phrases that are stored in the pager has generally been by a review of transmitted message history performed by a person, using informal (undocumented) rules. A means of storing the selected long phrases and associated tokens in the pager memory is by connecting the pager to a programmer which can program the tokens and the long phrases. The long phrases and tokens may be programmed at the time of manufacture of the pager, or they may be stored or altered after manufacture.

In either case, the selection of the long phrases may be inappropriate for a user's needs and quickly outdated largely because of the difficulty of altering the long phrases in the pagers, and also due to the human effort required to select more appropriate phases. Furthermore, because of the prior art manual methods used to select the phrases, the long segments of information stored in the pagers tend to be the same for all pagers used in a system, or at least for all pagers in a large portion or the system.

The use of a one token appended to a selective call message does not provide nearly as much channel efficiency improvement when longer alphanumeric message are being used in a system. Under these circumstances, it is not productive to attempt to shorten entire messages to unique tokens because they tend to be all different. Even with a common phrase (such as telephone numbers or the phrase "Call me") shortened to tokens, the remaining text tends to be longer in newer systems which employ pagers with memories that encourage the use of long text messages.

Thus, what is needed is a means to improve the process of selecting the common long phrases within text messages, on a unit by unit basis, and an improved means of storing the long phrases and the associated tokens into the pagers.

SUMMARY OF THE INVENTION

Accordingly, in a first embodiment of the present invention, a system for generating and substituting tokens for frequently used phrases within the information portion of messages, the messages comprising an address portion and an information portion, comprises a central control terminal and a selective call receiver. The central control terminal comprises a dynamic token generating means for generating a set of most frequently used phrases having uniquely associated tokens therewith, said token generator means accumulating and analyzing a number of the information portion of messages received at the central control terminal intended for transmission to one or more selective call receivers to derive the set of most frequently used phrases, a most frequently used phrase storage means for storing within the central control terminal the generated set of most frequently used phrases and associated tokens, and a most frequently used phrase download means for transmitting via a radio frequency transmitted message the generated set of most frequently used phrases and associated tokens to the one or more selective call receivers. The selective call receiver comprises a receiving and decoding means for receiving the download message transmitted by said most frequently used phrase download means and determining that the message is designated for the selective call receiver, and a storing means for storing the generated set of most frequently used phrases and associated tokens.

BRIEF DESCRIPTION OF THE DRAWING

FIG. 3 is a diagram showing an arrangement of phrase tables which reside in the paging terminal in accordance with a preferred embodiment of the present invention.

FIG. 4 is a diagram showing an arrangement of message tables which reside in the paging terminal in accordance with a preferred embodiment of the present invention.

FIG. 5 is a diagram showing example contents of the phrase tables shown in FIG. 3 in accordance with a preferred embodiment of the present invention.

FIG. 6 is a diagram showing example contents of the message tables shown in FIG. 3 in accordance with a preferred embodiment of the present invention.

FIG. 8 is a diagram showing an arrangement of a lookup table which resides in the pager in accordance with a preferred embodiment of the present invention.

FIG. 9, FIG. 10, FIG. 11, and FIG. 12 are flow charts showing a method used within the paging system controller for generating and inserting into paging messages tokens in accordance with a preferred embodiment of the present invention.

DETAILED DESCRIPTION OF THE INVENTION

Figure 1:
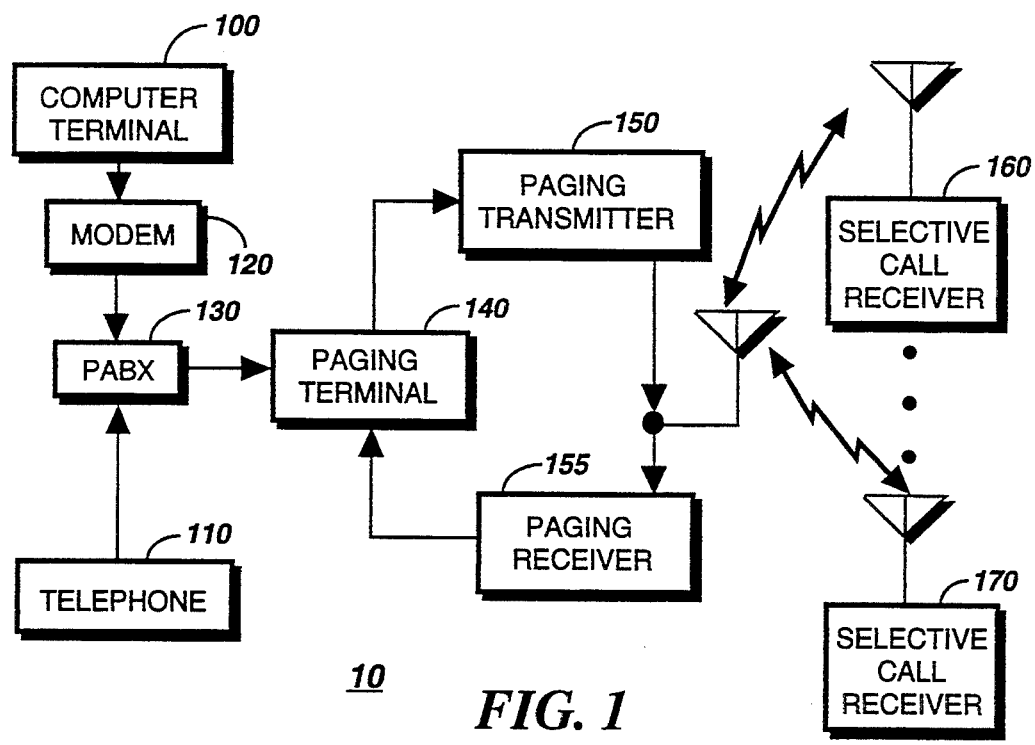
FIG. 1 is an electrical block diagram of a paging system in accordance with a preferred embodiment of the present invention.

Referring to FIG. 1, a paging (selective call) system 10 in accordance with the preferred embodiment of the invention is shown, which comprises input devices in the form of a computer terminal 100, a telephone 110, a modem 120, a private branch exchange (PABX) 130, a paging (selective call) terminal 140, a paging (selective call) transmitter 150, a paging (selective call) acknowledgment receiver 155, and pagers (selective call receivers) 160 and 170. The terminal 100 is connected to the PABX 130 by means of the modem 120, while the telephone 110 connects directly into the PABX 130. The telephone 110 can be of the pulse-dial or dual tone multi- frequency (DTMF) type. The modem 120 includes an autodialer which will be considered to be a DTMF type. Calls are coupled through the PABX 130 to the paging terminal 140. The paging transmitter 150 and the paging acknowledgement receiver 155 are well known to one of ordinary skill in the art. The pagers (selective call receivers) 160 and 170 are selective call transceivers capable of transmitting an acknowledgment signal in response to a received message, such as in accordance with U.S. Pat. No. 4,882,579 issued Apr. 21, 1989 to Siwiak et al, entitled "Code Division Multiplexed Ack Back Paging System", which is assigned to the assignee of the present invention and which is hereby incorporated by reference herein.

Figure 2:
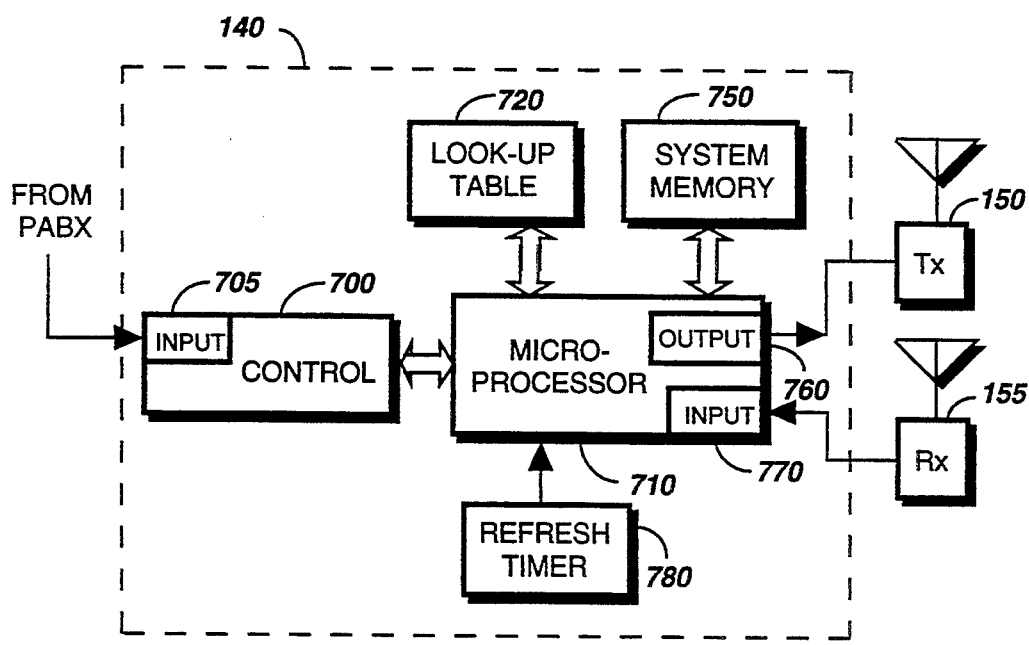
FIG. 2 is an electrical block diagram of a paging terminal in accordance with a preferred embodiment of the present invention.

FIG. 2 shows the paging, or central control, terminal 140 in accordance with the preferred embodiment of the invention, in greater detail, comprising a message input port 705, an input controller and supervisor 700, a microprocessor 710, a look-up table memory 720, a mini-system memory 750, a token refresh timer 780, a message output port 760 and an acknowledgment input port 770.

In the preferred embodiment of the present invention, data information originates from the telephone 110 or from the computer terminal 100. Information from the computer terminal is transferred by means of the modem 120 over a communications link to the PABX 130. This information and information from the telephone 110 is coupled through the PABX 130 to the message input port 705 of the paging terminal 140. The message is formulated into standard paging data messages by the input controller and supervisor 700 under control of the microprocessor 710. The formulated message contains address and data information parts. The address part indicates which of the pagers 160 and 170 are to accept the message. The data information is of any type, i.e., numeric, alphanumeric, or digitized analog voice. The formulation of the paging data message performed within the controller and supervisor 700 can optionally include the tagging of the message source, and/or the tagging of common functional information associated with the message. The tags become a tag portion of the message when they are formulated in a predetermined position within the message, e.g., directly after the address information. Otherwise, they are treated as part of the information part of the message.

FIG. 3 and FIG. 4 show in further detail the look-up table memory 720 within the paging terminal 140, in accordance with a preferred embodiment of the invention. Information that is derived from previously transmitted messages is stored by the microprocessor 710 in the look-up table memory 720, which contains two series of tables, a phrase table series 505 shown in FIG. 3 and a message table series 565 shown in FIG. 4. Each pager table in the phrase table series 505 consists, for example, of 32 records, each of which comprises a most frequently used phrase (MFU) and other items described below. Accordingly, these tables will be called MFU/token tables. An MFU/token table 500, which in the present instance is for the pager 160, begins with an MFU/token entry 510 and ends with an MFU/token entry 550. The MFU/token table 500 for the pager 170 starts with an MFU/token entry 560, and so on. Each MFU/token entry has defined, for example, four fields which are used to store the following information: a most frequently used phrase (MFU) 530, an associated token 520, an associated occurrence count (OC) 534, and an associated validity indicator 536. In the preferred embodiment of the present invention, the MFU field 530 consists of a string of symbols, each of which is eight bits in length, wherein the seven bit American Standard Code for Information Interchange (ASCII) is used for common alphanumeric characters and punctuation marks. It should be appreciated that other symbols of uniform length can be used in this system as well, and other predetermined quantities of MFU/token entries can be reserved for each pager.

The MFU field 530 of MFU/token entry 510 comprises a portion of the information part of a prior message transmitted to pager 160, which matched another portion of the information part of the same or a different prior message. The matched portions consist of any two equal length sequences of symbols within the information parts of the messages. It should be appreciated that the lengths of the information portions stored in the MFU fields of all the MFU/token entries are not of a predetermined number of symbols; however, a minimum length constraint can be used. It should also be appreciated that the MFU's need not contain whole words, but generally tend to do so in systems employing words and sentences. The occurrence count in field 534 stores the number of times the MFU in an MFU/token entry has been matched to different portions of prior messages to the same pager. The token in field 520 is preferably one symbol long. The tokens are unique for each MFU/token entry in the MFU/token table 500. In the present embodiment, there is a limit of 32 MFU/-token entries and the tokens are defined within the unused 128 symbols of the 256 symbols that are available as a consequence of the choice of an eight bit symbol length and the ASCII code, which requires the use of only 128 of the 256 available symbols. The associated validity indicator 536 has one of two values: "true" or "false", indicating whether or not the MFU and token of the MFU/token entry 510 have been downloaded successfully into the pager 160, in a process to be described below.

Each pager table in the message table series 565 comprises, for example, 20 entries. The message table 580, which in the present instance is for the pager 160, begins with a message entry 570 and ends with a message entry 575. Table 580 is a first-in first-out table, containing the previous twenty messages processed by the controller for pager 160. The messages in these entries contain tokens in place of all the phrases originally received by the terminal 140 which matched MFU phrases in the MFU/token table having an associated "true" validity indicators at the time the message was processed. When a new message is received which is designated for transmission to pager 160, the oldest message in the message table 580 is removed and the new message is processed and stored into the table 580.

It should be appreciated that another form of token is usable, for example, in systems having very long alphanumeric messages, or where there are not sufficient undefined symbols within the code chosen. The alternative form of the token comprises a predetermined multiple number of symbols, wherein the first symbol is a unique token indicator symbol not identified for other uses in the chosen code. For example, a two symbol token will provide 256 different tokens in a system using symbols of eight bits and the ASCII code. The symbol with decimal value 128 has no predetermined definition in ASCII, and is used for the first part of the token (a token indicator). The second symbol can then have any of the 256 possible values.

Referring to FIG. 5, the contents of the MFU/token table 500 for pager 160 are shown in an example wherein the terminal 140 has been initialized and a set of six messages as shown in Table 1 has been received and processed by the microprocessor 710. FIG. 6 shows the contents of the message table 580 for pager 160 for the same example. The oldest message in the set of received messages is message 1 in table 1. The newest message in the set of received messages is message 6 in table 1. In this example the MFU/token table 500 holds a maximum of four MFU/token entries, and the message table 580 holds a maximum of five entries. The microprocessor 710 has performed a phrase matching (by a method to be described below) of the contents of each of the messages in the set of received messages shown in table 1 to the contents of all previous received messages in table 1, thereby generating the MFU phrases stored in the MFU fields 530 of the MFU/token table 500. The associated occurrence counts 534 store the number of matches that have been found for the MFU's in MFU fields 530, with, for example, the occurrence count 534 for MFU/token entry 511 being a three as a result of the four messages that contain the identical phrase "Please call". No download message has been acknowledged by the pager 160, so all validity indicators 536 are "false". The message table 580 contains the newest message, message 6 of the set of received messages, stored in the message entry 570. The oldest message that is stored is message 2 of the set of received messages, in a message entry 572. The oldest message of the set of received messages, message 1, has been deleted because of the size limitation of the message table 580.

TABLE 1

| message 1 | Please call James at home |
| message 2 | Please call James at 734-2020 |
| message 3 | Please call Janice at work now |

TABLE 1-continued

| message 4 | Please call Fred at the office |
| message 5 | Emergency, please call Fred at the office |
| message 6 | Call me at 734-2020 |

Figure 7:
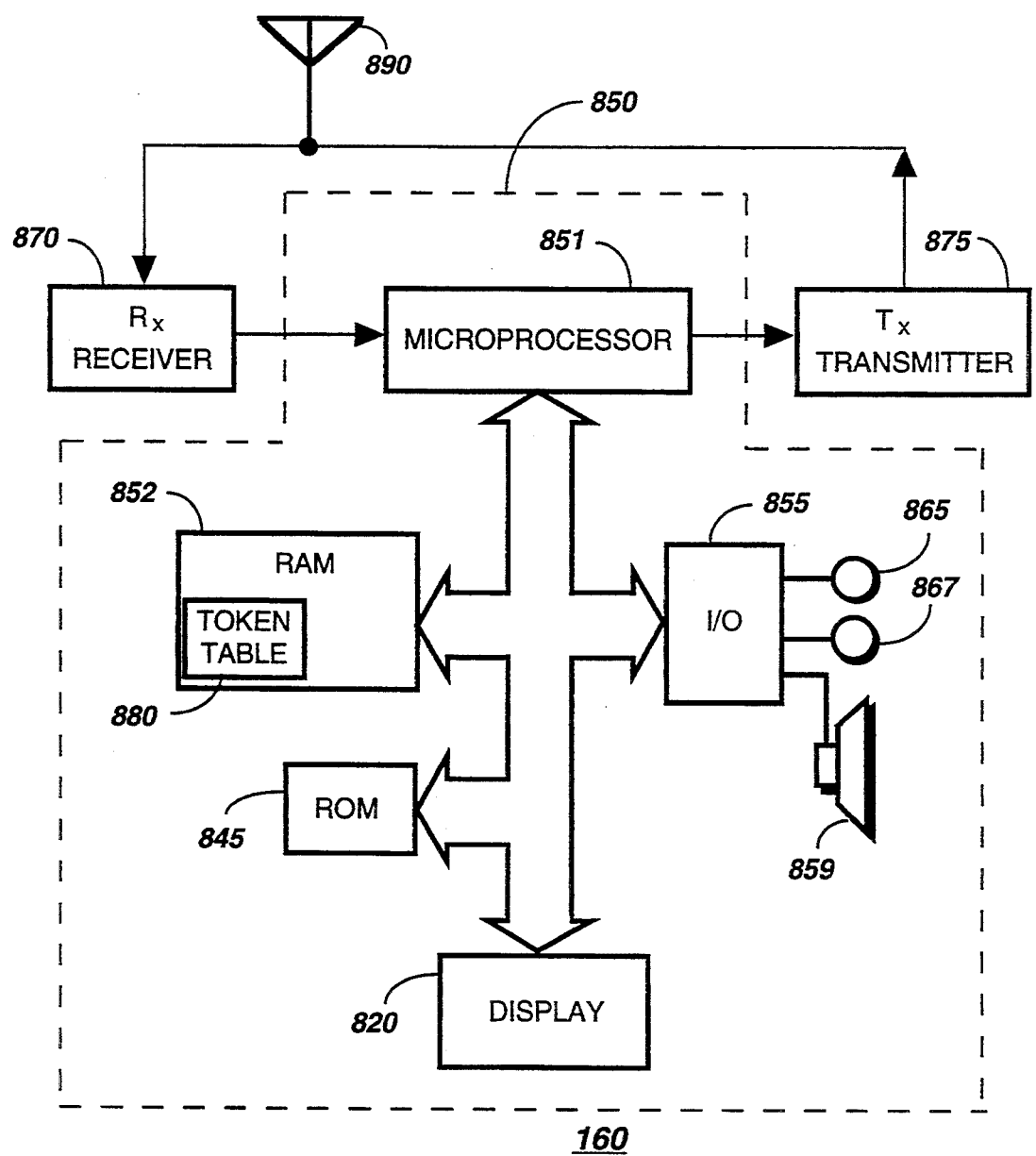
FIG. 7 is an electrical block diagram of a pager in accordance with a preferred embodiment of the present invention.
Figure 9:
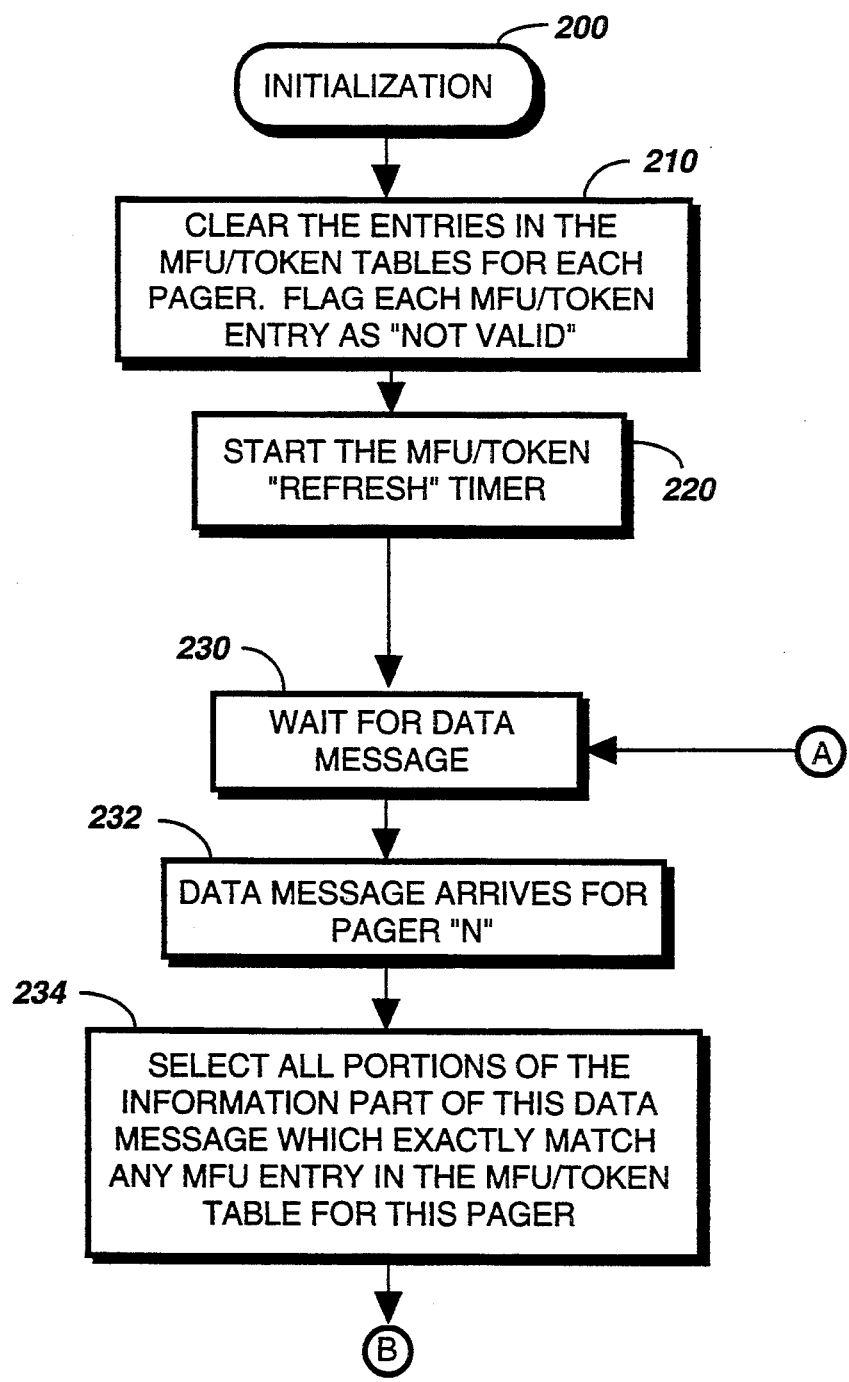
Figure 10:
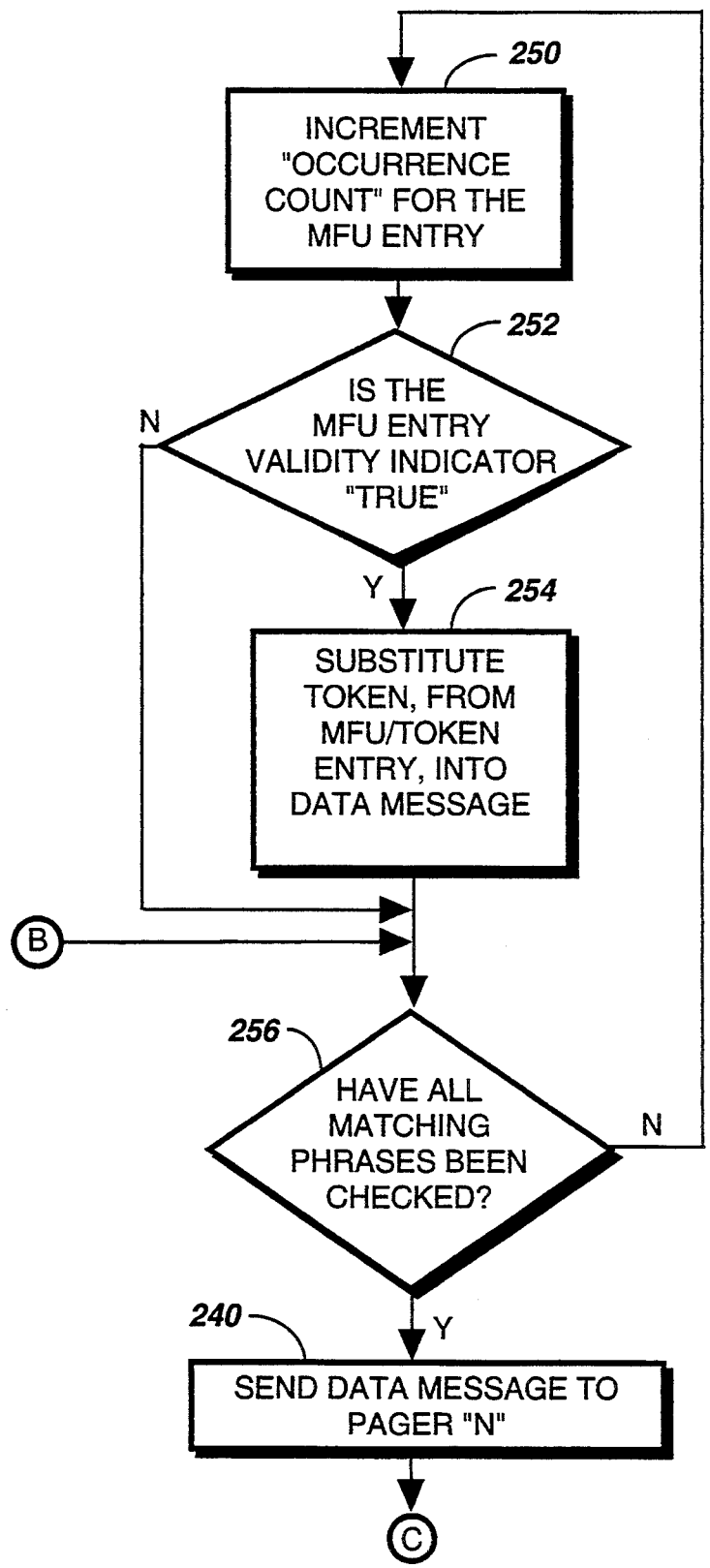
Figure 11:
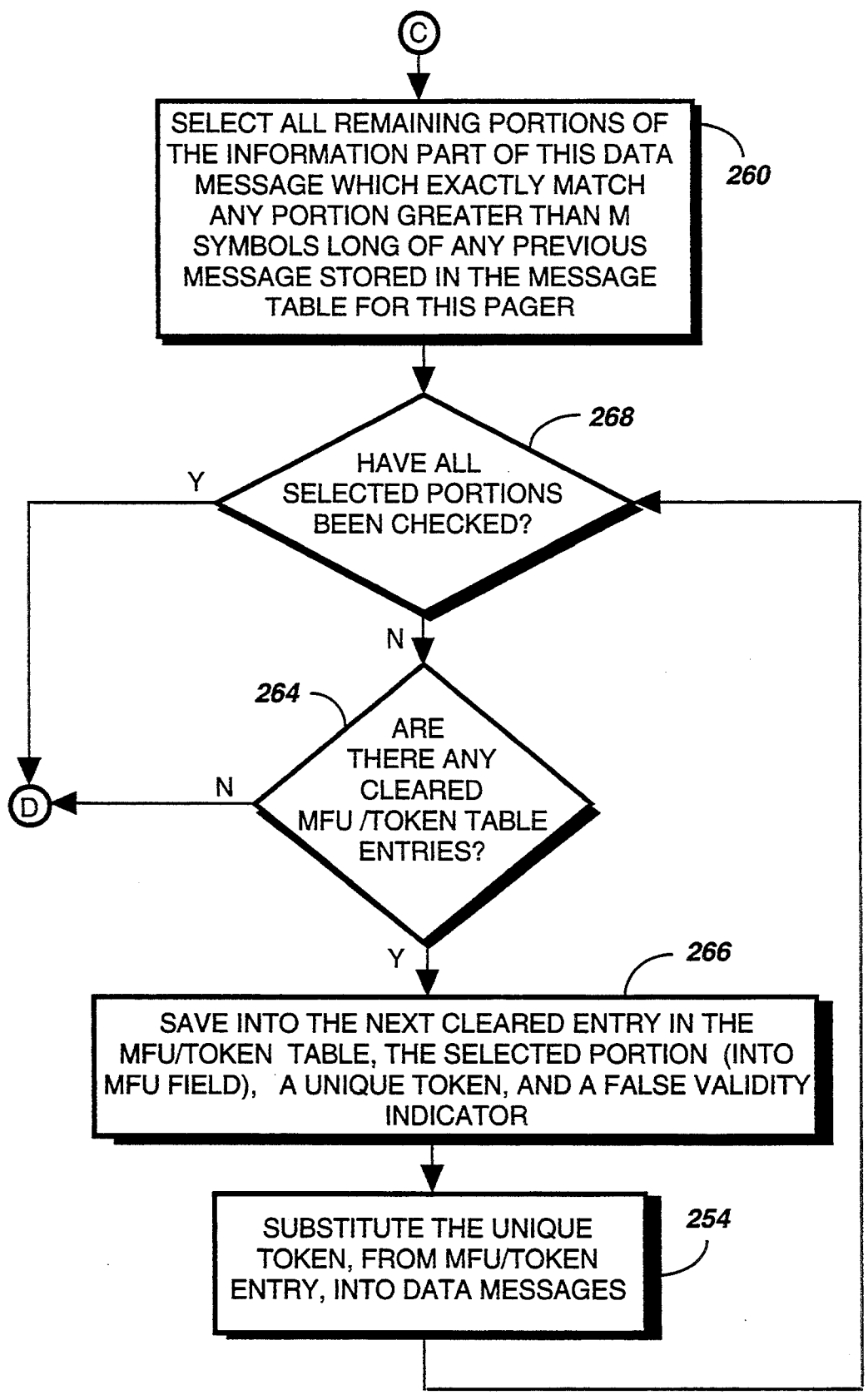

Referring to FIG. 7, an electrical block diagram for the pager 160 in accordance with a preferred embodiment of the present invention is shown. The pager 160 comprises an antenna 890 which couples received RF signals to a receiver 870 where they are processed to generate demodulated information to a controller 850. The controller 850 comprises a microprocessor 851, a random access memory 852, an input output (I/O) 855, operator controls 865 and 867, a read only memory (ROM) 845, a display 820, and a speaker 859. The microprocessor 851 further processes the information in accordance with programmed instructions stored in the ROM 845. When the microprocessor 851 determines that the address part of the message does not contain the address for pager 160, message processing ceases. When the microprocessor 851 determines that the address part of the message does contain the address of pager 160, the information part of the message is further processed. An MFU/token table 880 within the RAM 852 is used in the processing of the information part of the message in a manner to be described in detail below. Depending on the content of the information part of the message and the settings of the controls 865 and 867, the microprocessor 851 will perform one or more of the following actions: present information on the display 820, produce an alert signal from the speaker 859 through the I/O port 855, or transmit an acknowledgment message through a transmitter 875 which is coupled to an antenna 890.

Referring to FIG. 8, further details of the MFU/token table 880 in the pager 160, in accordance with the preferred embodiment of the present invention, are shown. The MFU/token table 880 has multiple MFU fields 590 and multiple token fields 593 which contain the identical MFU and token information as is contained within the MFU/token entries 510 through 550 of the MFU/token table 500 for pager 160 in paging terminal 140 which have a value "true" in their validity field 536. The occurrence counts and validity fields, are, however, not included in table 880. In the example shown (which is a different example than shown in FIG. 5 and FIG. 6), MFU/token entries #3, #5, and #8 are not in the table, because the validity indicators 536 for MFU/token entries #3, #5, and #8 in the MFU/token table 500 are "false". The method by which the table 880 is loaded into pager 160 will be described below.

Referring to FIG. 9, FIG. 10, FIG. 11, FIG. 12, FIG. 13, FIG. 14, FIG. 15, and FIG. 16, flow charts are shown that will now be used to describe the methods and apparatus for using tokens within this paging system in accordance with the preferred embodiment of the present invention. When reference is made in the figures to a particular pager, it is identified as pager "N". In the following description, pager 160 is used as a specific example of pager "N".

Referring to FIG. 2, FIG. 3, FIG. 9, FIG. 10, FIG. 11, and FIG. 12, a description of the method and apparatus used to generate a message from the paging terminal 140 to pager 160 which contains tokens substituted for MFU's follows. Initialization of the paging terminal 140 occurs in step 200 of FIG. 9. All the entries of the look-up table 720 are cleared in step 210, and the token refresh timer 780 is started in step 220. Upon formulation of a message by the controller and supervisor 700 for pager 160, the wait for data message step 230 is completed and processing of the message for pager 160 starts at step 232. The data message is processed to determine matching between any portion of the information part of the message and any MFU field 530 in all of the MFU/token entries of the MFU/token table 500 for pager 160, in step 234. When there are one or more matching phrases, then step 256 shown in FIG. 10 leads to step 250 wherein the occurrence count field 534 of the matching MFU/token entry is incremented by a value of one. In the next step 252 a test is performed to determine the value of the validity indicator field of the MFU/token entry. When the value is "true", the MFU is removed from the information part of the message and the token from the token field of the matching entry is substituted into the message in the place of the removed MFU, per step 254. When the value is "false" in step 252, or when step 254 is completed, the test in step 256 is performed again to determine when all phrases have been tested for substitution. When additional phrases remain, steps 250 and 252 are executed for the next remaining phrase. When no phrases remain, the message is transmitted from transmitter 150 in step 240. It should be appreciated that in this portion of the process the occurrence count in field 535 of the MFU/token entry has been updated in the table 500. After transmission of the message in step 240, the message is further processed in step 260, shown in FIG. 11, to determine matching between any portion of the information part of the message and any portion of the messages stored in the message table 580, wherein the matched portions are greater than a predetermined minimum number of symbols long, for example 5. In the next step 268 when there are one or more entries, a further test is performed in step 264 to determine if any cleared MFU/token entries remain in the MFU/token table 500 for pager 160. When there are clear MFU/token entries remaining in the MFU/token table 500, the matched phrase is stored into the MFU field 530, a token from all others already stored in MFU/token table 500 is stored into the token field 520, and a "false" is stored into the validity field 536, in step 266. The matched portions of the information part of the messages are replaced by the unique token in step 254. In step 268 when additional matched portions remain, they are processed as in step 264. When no additional entries are found in step 264 or when all matched portions are found to have been processed in step 268, the information part of the data message is stored, in step 270 shown in FIG. 12, into the message table 580, which is a first in first out table, replacing the oldest message in the message table 580 when it is full. Control then passes to step 230 shown in FIG. 9, where the terminal awaits the receipt of a another message to send to a pager.

Referring to FIG. 2, FIG. 3, FIG. 13, and FIG. 14, a description of the method and apparatus used to generate and send the MFU/token download message from the paging terminal 140 to the pager 160 follows. The microprocessor 710 of the paging terminal 140 is periodically alerted by the token refresh timer 780. Upon this alert, in step 300 of FIG. 13, the microprocessor 710 begins a scan through the first pager MFU/token table within the look-up table 720, in step 310. Scanning of the MFU/token table 500 for pager 160 begins at step 311 when the scanning of the prior MFU/token table (e.g., for pager 159) is completed in step 340 of FIG. 14. All new messages received from the controller and processor 700 are temporarily held in system memory 750 in step 311 in FIG. 13. These messages are released for processing and transmittal as described later. The "token count" variable is set to zero in step 312, and a pointer is positioned in step 314 to point to the first MFU/token entry in MFU/token table 500. When there are non-empty MFU/token entries remaining in the MFU/token table 500 for pager 160 in step 316 and when, in step 318, the occurrence count exceeds a required minimum value, the MFU and the token stored in the pointed MFU/token table entry are, in step 320, copied and appended onto an information part of an MFU/token download message which is being stored in the system memory 750. When the occurrence count in an MFU/token entry does not exceed the minimum required value in step 318, all tokens stored in messages in the message table 580 which are the same as the token in the MFU/token entry are replaced in step 322 by the MFU of the same MFU/token entry. When the pointed MFU/token table entry is cleared in step 318 or the MFU and the token are stored in step 320, and when more entries are determined to remain in step 324 the token count variable is incremented in step 326 and the scan of the MFU/token table for pager 160 is continued. When the pointed MFU/token table entry is cleared in step 318 or the MFU and the token are stored in step 320 and when no more additional entries are determined to remain in step 324 the MFU/token download message being stored in the system memory 750 is transmitted in step 342 of FIG. 14, to pager 160 with an indication (or "flag") that the message is a MFU/token download message.

Figure 13:
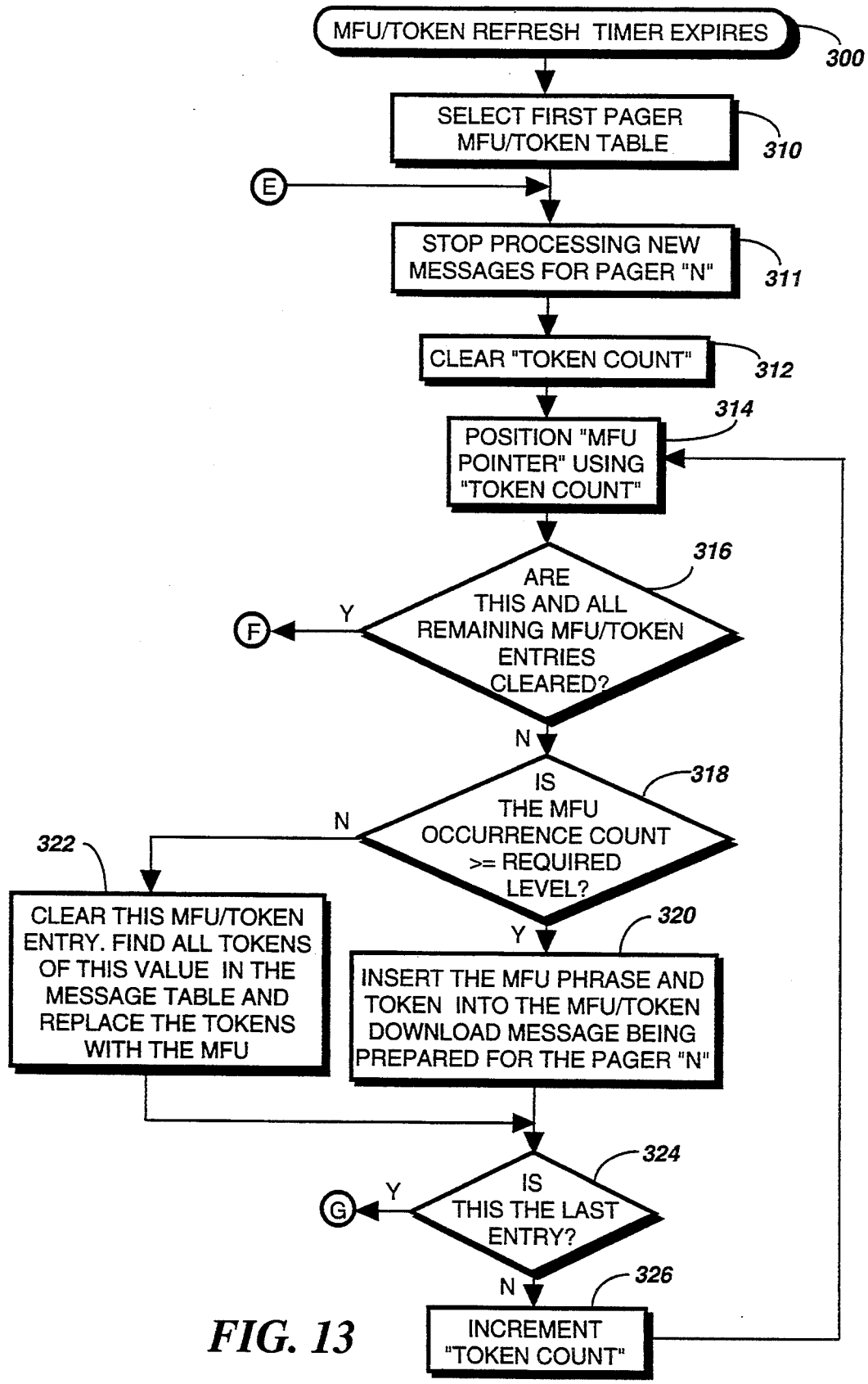
FIG. 13 and FIG. 14 are flow charts showing a method used within the paging controller for generating and transmitting to the pagers download messages containing the token and long phrase information in accordance with a preferred embodiment of the present invention.
Figure 14:
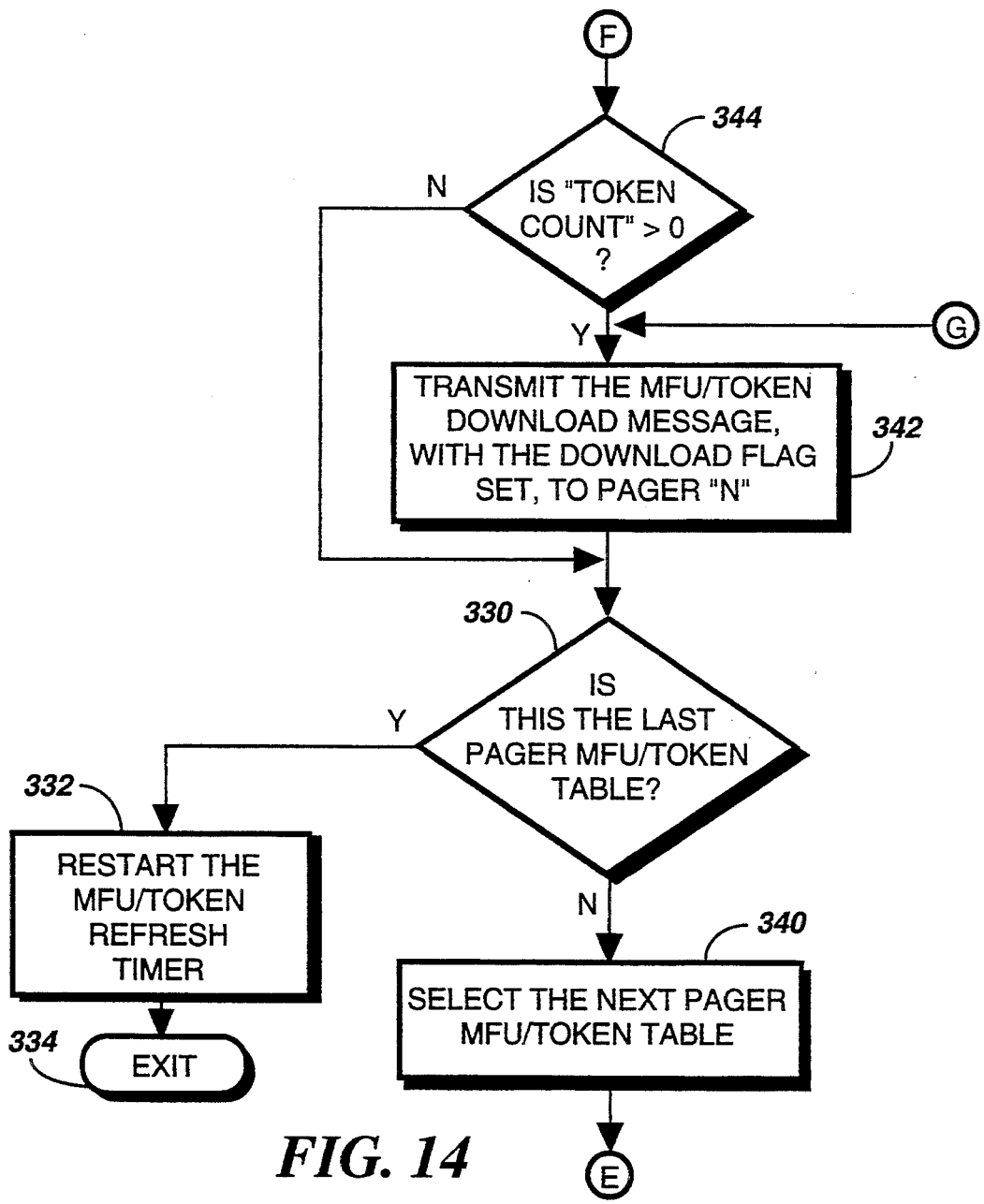

When all remaining MFU/token entries in the table for pager 160 determined to be clear in step 316 of FIG. 13, and the token count is determined to be zero in step 344 of FIG. 14, the MFU/token download message is transmitted in step 342. When the token count variable is not greater than zero as determined in step 344, or when a message transmission is completed in step 342, a determination is made in step 330 as to whether any pager tables remain. When there are, the next pager MFU/token table is selected for scanning in step 340 and the process repeats for the next pager MFU/token tables at step 311 of FIG. 13. When no further unscanned tables are determined to remain in step 330 of FIG. 14, the MFU/token refresh timer is restarted in step 332, at which point this method is exited in step 334.

It should be appreciated that there are additional methods of determining MFU's that are to be cleared from the MFU/token table. For example, the number of messages sent to a pager since the last time each token was used can be counted. If a predetermined maximum is reached, the MFU/token entry is then cleared. This can be beneficial in some systems.

Figure 15:
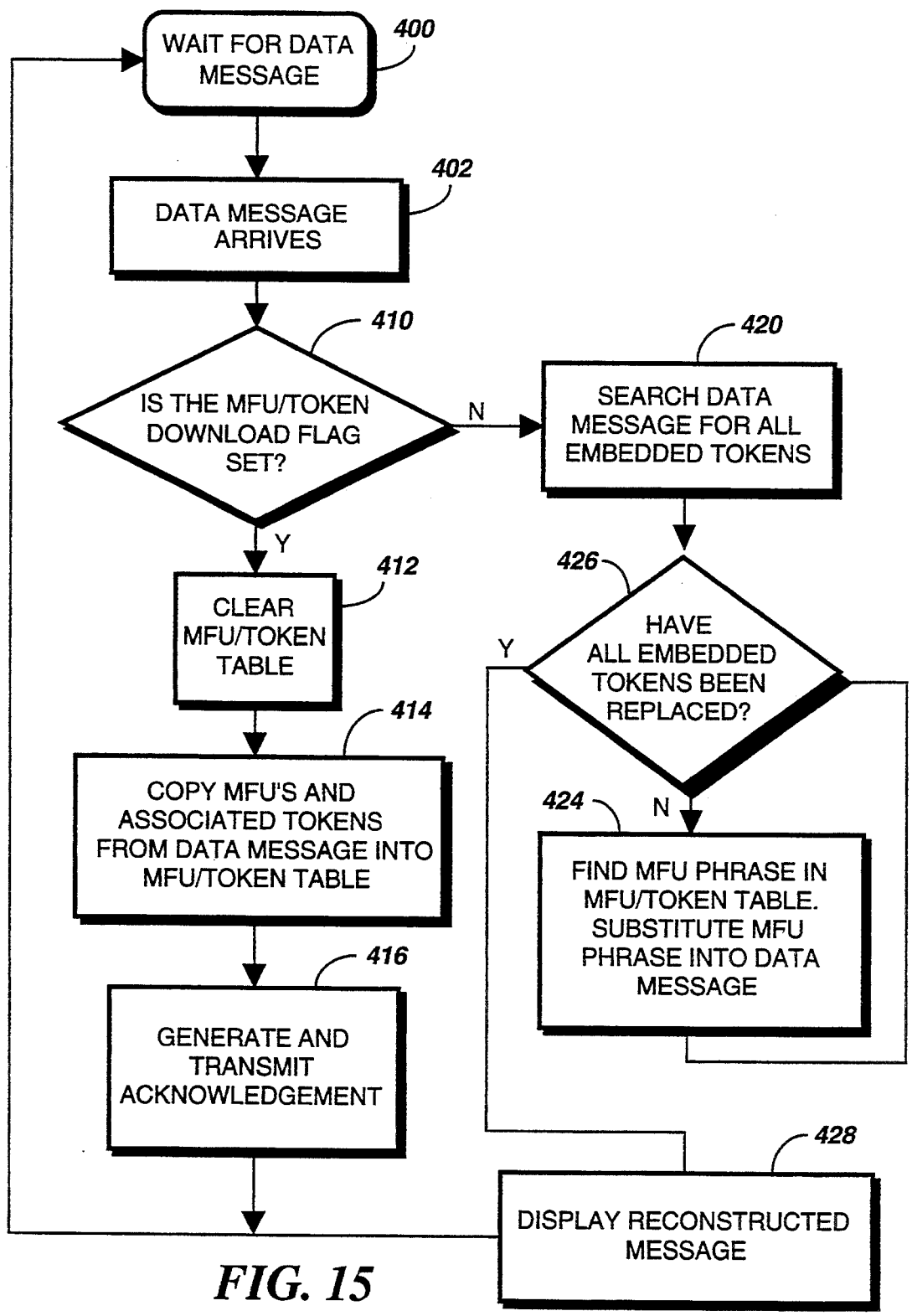
FIG. 15 is a flow chart showing a method used within a pager for processing and responding to messages received in accordance with a preferred embodiment of the present invention.

Referring to FIG. 7, FIG. 8, and FIG. 15, a description follows of the method and apparatus used in pager 160 to receive and process a message from the paging terminal 140 to pager 160 which is either an information message containing tokens substituted for MFU's or an MFU/token download message. In step 400 the message is received by pager 160. Processing by the microprocessor 851 commences at step 402, in which verification of the address part of the message is completed. The microprocessor 851 searches the message, in step 410, for the flag which indicates a MFU/token download message.

When the flag indicates a download type message, the MFU/token table 880 is cleared in step 412 and the information part of the message is loaded, in step 414, into the MFU/token table 880 resulting in a table of the format as described for FIG. 8. An acknowledgment message indicating receipt of the download information is transmitted in step 416 and the message receiving function awaits another message at step 400.

In step 410, when the flag indicates the message is not an MFU/token download message, the message is searched for all tokens in the information part of the message in step 420. When one or more tokens are found in the message in step 426, a token is removed from the message and replaced in step 424 by the associated MFU phrase stored in the MFU/token entry of the MFU/token table 880 which contains the removed token. The test in step 426 is reperformed until no tokens remain. The original information is then processed according to information within the message and settings of the pager controls, in step 428. For example, this will result in presentation of information on the pager display 854 or activation of alerts conveyed through I/O port 855 to speaker 859.

Figure 16:
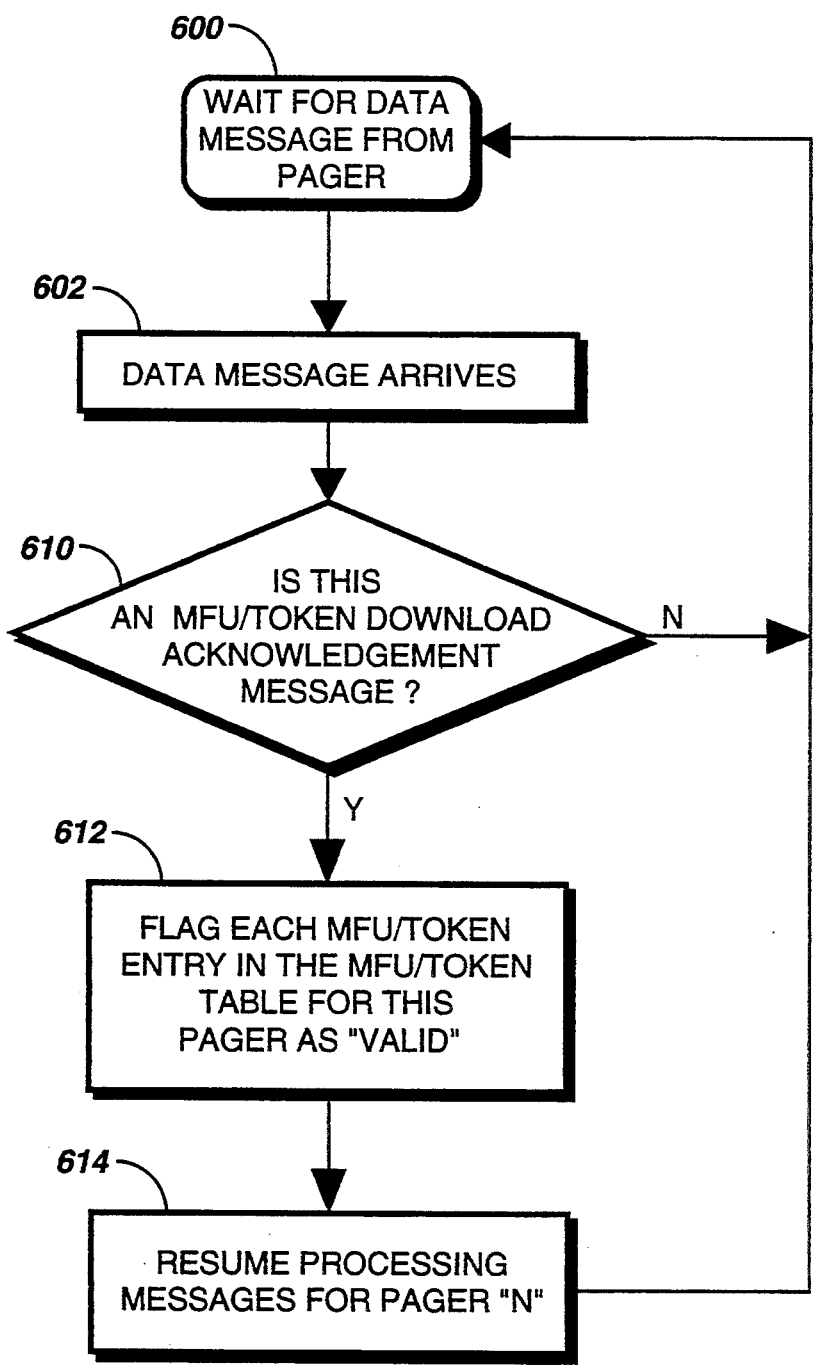
FIG. 16 is a flow chart showing a method used within the paging controller for processing the acknowledgments received from the pagers in accordance with a preferred embodiment of the present invention.

Referring to FIG. 2 and FIG. 16, a description of the method and apparatus used in the paging terminal to handle an acknowledgment of an MFU/token download message transmitted from pager 160 follows. The pager 170 awaits the receipt of messages in step 600. The microprocessor 710 determines the message type at step 610. The message from pager 160 is received at pager 170 and routed to the paging terminal 140, at step 602. When the paging terminal microprocessor 710 determines that the message is an MFU/token download acknowledgment message in step 610, the validity indicators of all the non-empty entries in the MFU/token table 500 are set to "true" in step 612, and any messages which have been held in system memory 750 for pager 160 are processed for transmitting in step 614. When the received message is determined not to be an acknowledgment for an MFU/token download message, in step 610, or when processing of messages intended for pager 160 is resumed in step 614, the MFU/token downloading method returns to the wait mode at step 600.

In the event that the acknowledgment is not received in a timely fashion after the download message is transmitted, retransmission attempts are undertaken, until the download message is successfully acknowledged.

It should be appreciated that other apparatus and methods can be used to generate the MFU's and associated tokens. In one such method, separate tables of valid MFU's and non-valid MFU's are provided, as well as the message table. Another method provides only a single table of valid MFU's 505 and a message table 565. The download message is formulated in a batch process that is started upon the alert by the token refresh timer 780 and terminates with the receipt of an acknowledgement to the download message. In this batch method, the phrase table for a pager 160 is either updated or replaced upon receipt of the acknowledgement, precluding the need for a validity indicator. This is contrast to the distributed, continuous process for determining new MFU's described in detail above. In this batch method, the new phrases can be derived only from the current batch of accumulated messages 565, or by comparing them to the current MFU table 505 and merging the ones with the highest occurrence counts. The latter method provides a selection effectively based on a larger set of messages, similar to the preferred embodiment of the present invention described in detail above. In an alternative, usable for any of the methods described, the messages could be stored without the substitution of tokens.

Figure 17:
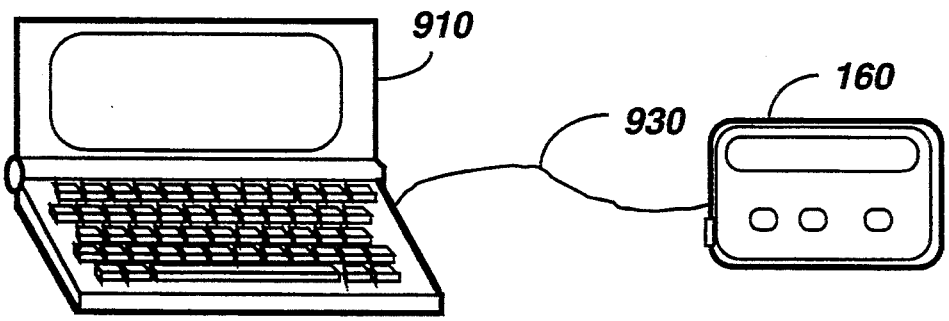
FIG. 17 is an electrical block diagram showing a pager connected to a data terminal.

Referring to FIG. 17, an electrical block diagram of the pager 160 coupled to a data terminal 910 by means of cable 930 is shown. The data terminal 910 generates data message signals that are provided to the pager 160 for transmission to the paging terminal 140. The address portion of the message can indicate that the message is to be further routed to another pager or to a wire line destination other than the paging terminal 140. The information part of data messages coupled to the pager 160 by the data terminal 910 are searched for MFU's matching those MFU's stored in the table 880, and tokens are substituted when matches are found. The message is then transmitted from the pager 160 to the paging terminal 140, where the information portion of the message is reconstructed using the MFU table 510 for the pager 160 in the paging terminal 140. Thus, the same channel efficiency advantages are derived for the inbound path as are derived for the outbound path. These advantages are particularly important in systems having non symetric power paths in the inbound and outbound channels, as are typical in paging systems with acknowledge-back capability. This improvement can be used to allow the transmission of messages on such an acknowledge-back channel which might not otherwise be possible.

This improvement will also benefit the efficiency of transmissions on two-way data communication systems with symetrical power paths.

By now it should be appreciated that there has been provided a method and apparatus which automatically shortens the length of messages transmitted in a radio selective call radio communication system thereby improving the throughput of the system.

I claim:

1. A system for generating and substituting tokens for frequently used phrases within an information portion of messages, the messages comprising an address portion and the information portion, comprising:

a central control terminal comprising
dynamic token generating means for generating a set of most frequently used phrases having uniquely associated tokens therewith, said token generator means accumulating and analyzing a number of the information portion of messages received at the central control terminal intended for transmission to one or more selective call receivers to derive the set of most frequently used phrases corresponding thereto,
most frequently used phrase storage means for storing within the central control terminal the generated set of most frequently used phrases and associated tokens, and
most frequently used phrase download means for transmitting via a radio frequency signal the generated set of most frequently used phrases and associated tokens corresponding to the one or more selective call receivers; and
said one or more selective call receivers comprising
receiving and decoding means for receiving the transmitted set of most frequently used phrase and associated tokens determined by said decoding means to be designated for the selective call receiver, and storing means for storing the generated set of most frequently used phrases and associated tokens.

2. The system in accordance with claim 1, wherein: said selective call receiver further comprises download acknowledgement generation means for generating an acknowledgement message in response to receiving the set of most frequently used phrase and associated tokens, and transmitting means for transmitting the download acknowledgement message; and said central control terminal further comprises receiving means for receiving the download acknowledgement message; and repeating means for repeating the download message transmission by said frequently used phrase download means when the download acknowledgement message is not received after a predetermined time period following the download message transmission.

3. The system in accordance with claim 2, wherein said central control terminal further comprises:

inhibiting means for inhibiting the transmission of, and accumulating in storage the messages intended for one or more of the one or more selective call receivers being downloaded by said most frequently used phrase download means;

accumulating means for storing the messages inhibited by said inhibiting means; and enabling means for transmitting the messages accumulated by said accumulating means and for uninhibiting the transmission of the messages inhibited by the inhibiting means when the download acknowledgement message is received.

4. The system in accordance with claim 1, wherein: said central control terminal further comprises token substitution means for substituting within a first form of the information portion of the message one or more tokens for respective phrases matching the one or more respective stored most frequently used phrases, thereby generating a second form of the information portion of the message, and transmitting means for transmitting the second form of the information portion of the message; and wherein said selective call receiver further comprises receiving means for receiving the second form of the information portion of the message, and phrase substitution means for substituting within the second form of the information portion of the message the one or more stored most frequently used phrases for the respective one or more tokens, thereby re-creating the first form of the information portion of the message.

5. The system in accordance with claim 1, wherein: said selective call receiver further comprises token substitution means for substituting within a first form of the information portion of the message one or more tokens for respective phrases matching the one or more respective stored most frequently used phrases, thereby generating a second form of the information portion of the message, and transmitting means for transmitting the second form of the information portion of the message; and said central control terminal further comprises receiving means for receiving the second form of the information portion of the message, and phrase substitution means for substituting within the second form of the information portion of the message the one or more stored most frequently used phrases for the respective one or more tokens, thereby re-creating the first form of the information portion of the message.

6. The system in accordance with claim 1, wherein the information portion of the messages is digital.

7. The system in accordance with claim 1, wherein the information portion of the messages is variable length.

8. The system in accordance with claim 1, wherein said central control terminal and selective call receiver further comprise means for processing tokens comprising a single symbol, the symbol being one of a plurality of unique values selected from a symbol set used for encoding the information portion of the message, the plurality of values selected being reserved to represent only the tokens.

9. The system in accordance with claim 1, wherein said central control terminal and selective call receiver further comprise means for processing tokens comprising a sequence of predetermined number of symbols, the first symbol being a unique value selected from a symbol set used for coding the information portion of the message, the value selected being reserved for the first symbol in the token sequence, and the remaining one or more symbols being any unique combination of symbols selected from the complete symbol set.

10. The system in accordance with claim 1, wherein the address portion comprises a designation of a group of selective call receivers.

11. The system in accordance with claim 1, wherein the address portion comprises a designation of a source of the first form of the message.

12. A central control terminal for generating and substituting tokens for frequently used phrases within an information portion of messages, the messages comprising an address portion and the information portion, comprising:

dynamic token generating means for generating a set of most frequently used phrases having uniquely associated tokens therewith, said token generator means accumulating and analyzing a number of the information portions of messages received at the central control terminal intended for transmission to one or more selective call receivers to derive the set of most frequently used phrases corresponding thereto, and most frequently used phrase storage means for storing within the central control terminal the generated set of most frequently used phrases and associated tokens.

13. The central control terminal in accordance with claim 12, further comprising:

receiving means for receiving the second form of the information portion of the message, and phrase substitution means for substituting within the second form of the information portion of the message the one or more stored most frequently used phrases for the respective one or more tokens, thereby re-creating the first form of the information portion of the message.

14. The central control terminal in accordance with claim 12, further comprising:

most frequently used phrase download means for transmitting via radio frequency signal the generated set of most frequently used phrases and associated tokens corresponding to the one or more selective call receivers;

token substitution means for substituting within a first form of the information portion of the message one or more tokens for respective phrases matching the one or more respective stored most frequently used phrases, thereby generating a second form of the information portion of the message; and transmitting means for transmitting the second form of the information portion of the message.

15. The central control terminal in accordance with claim 14, wherein said dynamic token generation means stores a validity indicator associated with each of the most frequently used phrases, which indicator indicates whether or not the associated most frequently used phrase and token has been transmitted to the one or more selective call receivers.

16. The central control terminal in accordance with claim 14, further comprising:

receiving means for receiving a download acknowledgement message from one of the one or more selective call receivers;

repeating means for repeating the download message transmission by said frequently used phrase download means when the download acknowledgement message is not received within a predetermined time period following the download message transmission;

inhibiting means for inhibiting the transmission of, and accumulating in storage the messages intended for one or more of the one or more selective call receivers being downloaded by said most frequently used phrase download means; accumulating means for storing the messages inhibited by said inhibiting means; and enabling means for transmitting the messages accumulated by said accumulating means and for uninhibiting the transmission of the messages inhibited by the inhibiting means when the download acknowledgement message is received.

17. The central control terminal in accordance with claim 16, wherein said dynamic token generation means stores a validity indicator associated with each of the most frequently used phrases, which validity indicator indicates whether or not the acknowledgement for transmitted associated most frequently used phrase and token has been received from the one or more selective call receivers.

18. A method of generating a set of tokens and most frequently used phrases for use in a selective call radio communication system which comprises a central control terminal and a plurality of selective call receivers, said method comprising the steps of:

receiving, at the central control terminal, a plurality of messages intended for transmission to at least one of the plurality of selective call receivers;

accumulating, in a storage device within the central control terminal, a set comprising a number of information portions from the messages received; and processing the number of information portions stored, said step of processing comprising the steps of determining the number of exact matches between the number of information portions stored, and portions thereof, to identify unique matching phrases, associating the number of exact matches with the unique matching phrases identified, and generating therefrom an associated occurrence count generating a set of unique phrases from the unique matching phrases identified which have the largest associated occurrence counts and generating a set of most frequently used phrases comprising a plurality of most frequently used phrase subsets which comprise a unique phrase and an associated unique token storing the set of most frequently used phrases in a current phrase and count table in the storage device in the central control terminal.

19. The method according to claim 18, wherein said step of accumulating accumulates in the storage device a plurality of sets associated with a plurality of selective call receivers, the sets comprising a number of information portions from the messages received for each of the plurality of intended receivers, and wherein said step of processing generates sets of most frequently used phrases associated with each of the plurality of intended receivers.

20. The method according to claim 18 wherein a refresh process is repetitively initiated upon the receipt at the central control terminal of a number of messages intended for transmission to one of the at least one of the plurality of selective call receivers, said method comprising the steps of:

inhibiting the transmission from the central control terminal of the plurality of messages intended for transmission to the one of the at least one of the plurality of selective call receivers;

accumulating the inhibited messages in a storage device in the central control terminal;

performing said receiving step;

performing said information portion accumulating step wherein the set comprises a number of information portions from the messages received intended for the one of the at least one selective call receiver; performing said processing step;

downloading the most frequently used phrase subsets comprising the most frequently used phrase and the associated token to the one of the at least one of selective call receivers;

transmitting from the central control terminal the accumulated messages intended for the one of the at least one selective call receiver; and resuming the transmission from the central control terminal of the plurality of messages intended for transmission to the one of the at least one of the plurality of selective call receivers.

21. The method according to claim 20 wherein a prior phrase and count table exists, and wherein the prior phrase and count table and the current phrase and count table are merged in a process comprising the steps of:

adding to the current table the subsets from the prior table within which subsets the phrases are not duplicated within the subsets in the current table, incrementing the associated occurrence count within the subsets in the current table within which subsets phrases occur that duplicate phrases within the subsets in the prior table, by the value of the occurrence count within the respective subsets in the prior phrase and count table.

* * * * *